United States Patent
Nishimura et al.

(10) Patent No.: US 7,209,164 B2
(45) Date of Patent: *Apr. 24, 2007

(54) IMAGE RECORDING UNIT HAVING A SPHERICAL SURFACE PORTION FOR DEFINING A DRIVING SURFACE AND CAMERA

(75) Inventors: Hiroshi Nishimura, Tokyo (JP); Osamu Sakata, Tokyo (JP); Sakiko Yamaguchi, Kawasaki (JP); Rikako Sakai, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 10/819,519

(22) Filed: Apr. 6, 2004

(65) Prior Publication Data

US 2004/0190863 A1    Sep. 30, 2004

Related U.S. Application Data

(63) Continuation of application No. 08/364,704, filed on Dec. 28, 1994, now Pat. No. 6,734,914.

(30) Foreign Application Priority Data

Dec. 28, 1993  (JP)  ................... 5-337150
Nov. 22, 1994  (JP)  ................... 6-288123

(51) Int. Cl.
    H04N 5/225    (2006.01)
(52) U.S. Cl. .................. 348/207.99; 348/143
(58) Field of Classification Search ............ 348/375, 348/143, 207.99, 211.99; 359/814
    See application file for complete search history.

(56) References Cited

U.S. PATENT DOCUMENTS 4,225,881 A    9/1980    Tovi (Continued)

FOREIGN PATENT DOCUMENTS

DE    3813544 A1    11/1989

(Continued)

OTHER PUBLICATIONS

Communication from the European Patent Office dated Mar. 20, 1995 enclosing European Search Report for EP Application No. 94309848.3.

(Continued)

Primary Examiner—Tuan Ho
(74) Attorney, Agent, or Firm—Morgan & Finnegan, L.L.P.

(57) ABSTRACT

An object of this invention is to provide an image recording unit, which can pivot an image recording unit main body having a photographing optical system, which includes at least a photographing lens and an image pickup element, like the behavior of an eyeball, can realize a compact camera as a whole, and can reduce noise. In order to achieve this object, an image recording unit of this invention includes an image recording unit main body which accommodates at least a photographing lens and photographing apparatus in a case, and has a spherical surface portion for defining a driving surface at least on the outer surface of the case, support means for rotatably supporting the image recording unit main body to have a crossing point of at least two orthogonal axes as a center of rotation of the spherical portion, and frictional driving apparatus for frictionally driving the image recording unit main body independently in arbitrary directions by a frictional force generated between the driving surface and the support mechanism.

8 Claims, 12 Drawing Sheets

U.S. PATENT DOCUMENTS

| | | | |
|---|---|---|---|
| 4,788,596 A | 11/1988 | Kawakami et al. | |
| 4,855,823 A | 8/1989 | Struhs et al. | |
| 4,855,838 A | 8/1989 | Jones et al. | |
| 4,901,146 A | 2/1990 | Struhs et al. | |
| 5,153,623 A | 10/1992 | Bouvier | |
| 5,502,598 A * | 3/1996 | Kimura et al. | 359/814 |
| 6,476,856 B1 * | 11/2002 | Zantos | 348/151 |
| 6,639,625 B1 * | 10/2003 | Ishida et al. | 348/218.1 |

FOREIGN PATENT DOCUMENTS

| | | |
|---|---|---|
| DE | U 93/11283 | 12/1993 |
| EP | A 468839 | 1/1992 |
| EP | A 544996 | 6/1993 |
| GB | A 2210530 | 6/1989 |
| JP | 2280220 | 11/1990 |
| JP | 4038507 | 2/1992 |
| JP | 5296227 | 11/1993 |
| JP | 5336768 | 12/1993 |

OTHER PUBLICATIONS

Patent Abstracts of Japan, vol. 15, No. 47 (P-1162) published Feb. 5, 1991, corresponding to Japanese Patent No. JP2280220.

Patent Abstracts of Japan, vol. 16, No. 211 (P-1355) published May 19, 1992, corresponding to Japanese Patent No. JP4038507.

Patent Abstracts of Japan, vol. 18, No. 90 (M-1560) published Feb. 15, 1994, corresponding to Japanese Patent No. JP5296227.

Patent Abstracts of Japan, vol. 18, No. 167 (E-1528) published Mar. 22, 1994, corresponding to Japanese Patent No. JP5336768.

* cited by examiner

FIG. 3A  SPHERICAL SHAPE
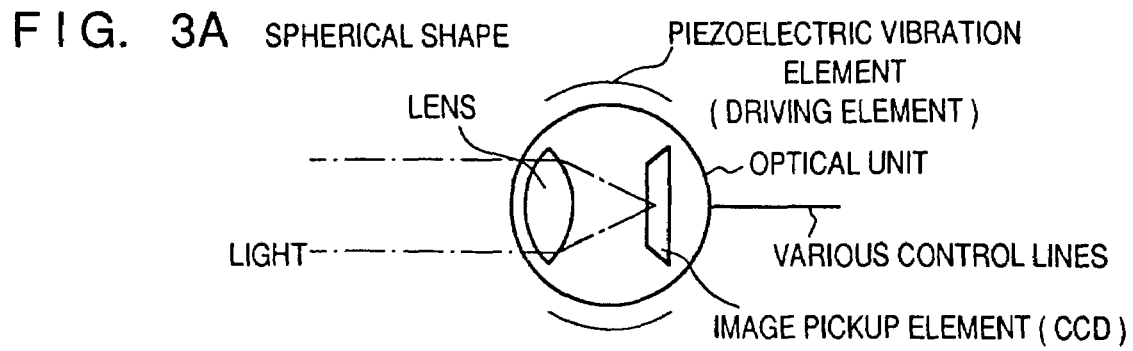
FIG. 3B  SPHERICAL SHAPE + CONICAL SHAPE
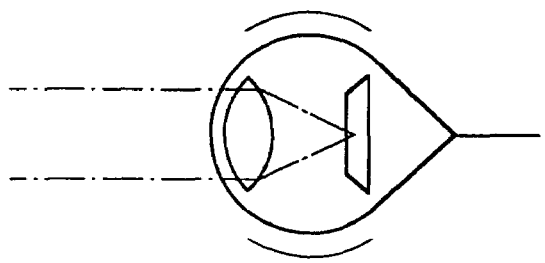
FIG. 3C  SPHERICAL SHAPE + PLANAR SHAPE
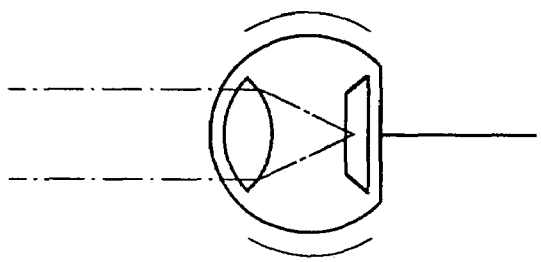
FIG. 3D  SPHERICAL SHAPE + CYLINDRICAL SHAPE
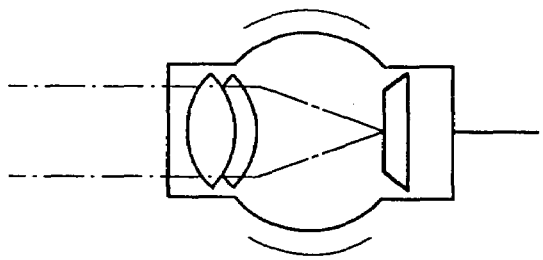
FIG. 3E
TYPE HAVING LENS AND IMAGE PICKUP ELEMENT OUTSIDE SPHERICAL UNIT
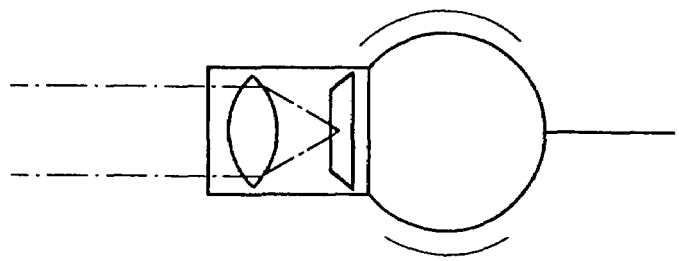

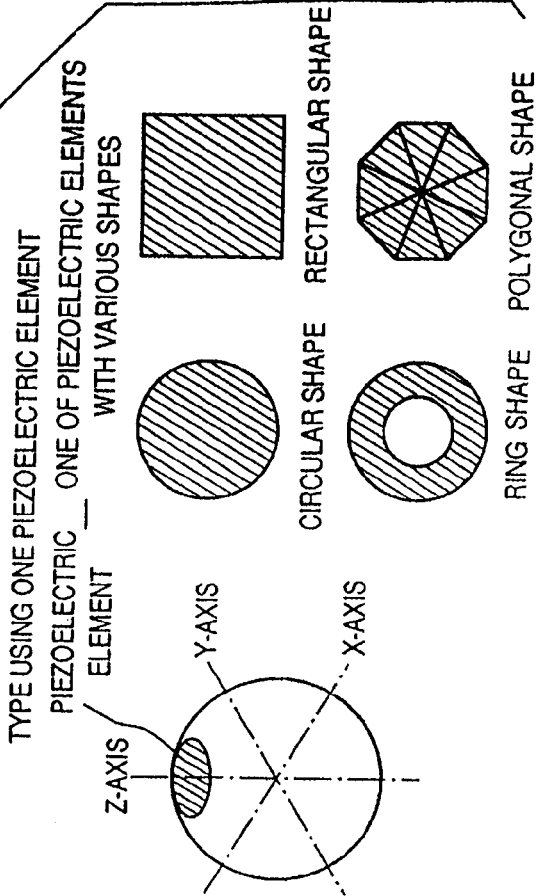
FIG. 4C TYPE USING PAIRS OF PIEZOELECTRIC ELEMENTS
FIG. 4D TYPE USING ONE PIEZOELECTRIC ELEMENT — PIEZOELECTRIC ELEMENTS WITH VARIOUS SHAPES (RECTANGULAR SHAPE, POLYGONAL SHAPE, CIRCULAR SHAPE, RING SHAPE)
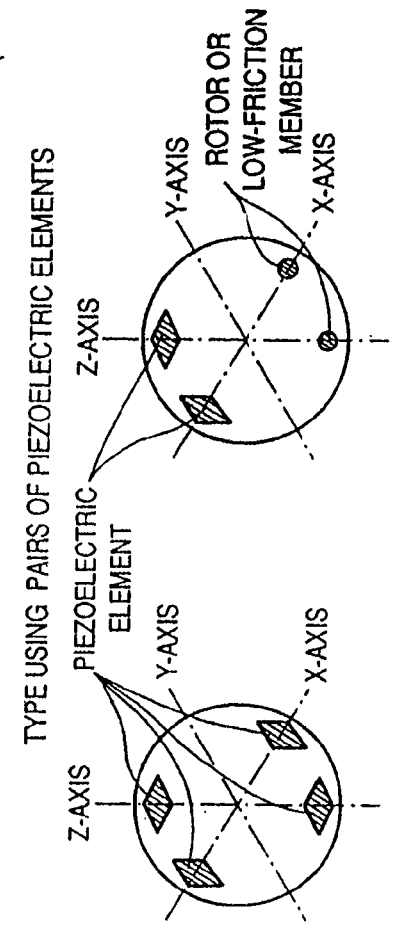
FIG. 4A TYPE USING TRANSPARENT FIXING FRAME (WIDENING VIEW FIELD RANGE)
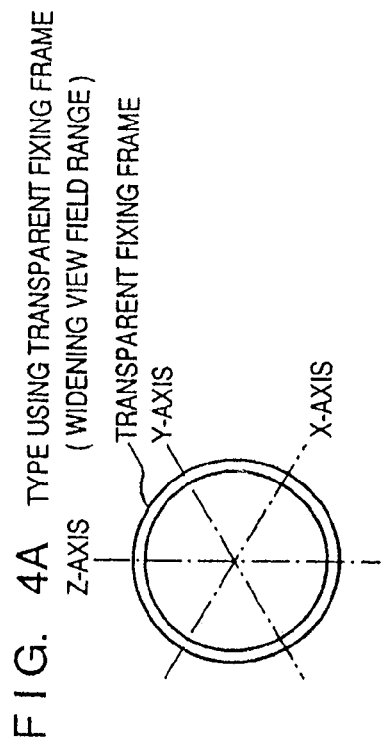
FIG. 4B TYPE USING RING-SHAPED (LARGE NUMBER OF) PIEZOELECTRIC ELEMENTS

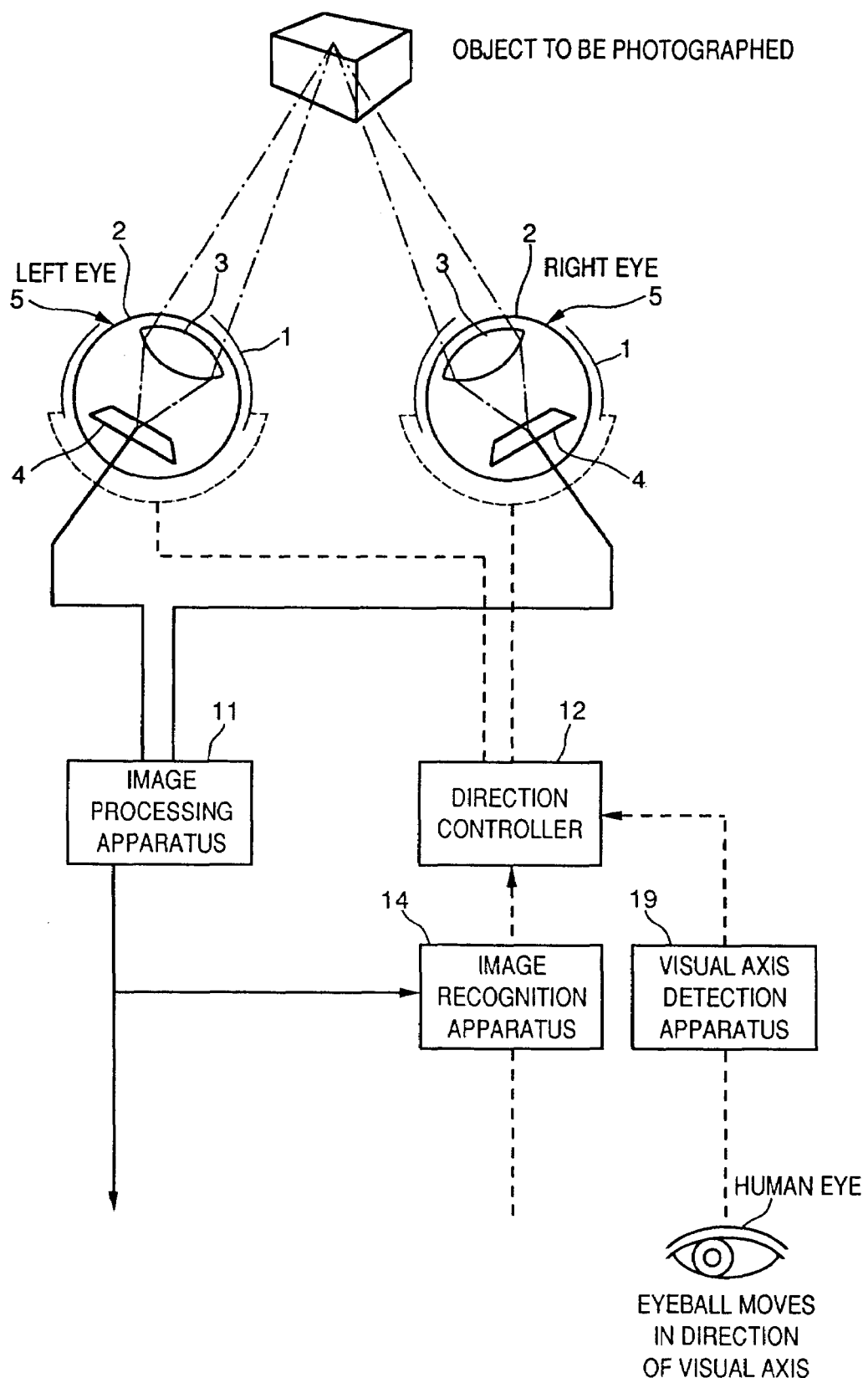

IMAGE RECORDING UNIT HAVING A SPHERICAL SURFACE PORTION FOR DEFINING A DRIVING SURFACE AND CAMERA

This is continuation of application Ser. No. 08/364,704, filed Dec. 28. 1994 now U.S. Pat. No. 6,734,914.

BACKGROUND OF THE INVENTION

The present invention relates to an image recording unit which can pivot an image recording unit main body formed into, e.g., a spherical shape, in the direction of a photographing object like the behavior of an eyeball, and a camera having the image recording unit.

As a conventional mechanism for changing the photographing direction of a camera, a system in which a camera main body is attached onto a rotary base (panhead), and the rotary base is motor-driven has been proposed.

However, in the above-mentioned conventional mechanism for changing the photographing direction of the camera, a driving device for rotation is arranged outside the camera main body, resulting in a large structure. In this case, attainable size reduction of a device for fetching an image is limited. In particular, in order to assemble this device in a robot's eye (image input device), the conventional structure has a considerable limitation in size.

Noise upon driving is not small in the conventional mechanism since a device for rotation is arranged outside the camera main body in the conventional mechanism.

SUMMARY OF THE INVENTION

The present invention has been made in consideration of the above situation, and has as its principal object to provide an image recording unit, which pivots an image recording unit main body with a photographing optical system, which includes at least a photographing lens and an image pickup element, like the behavior of an eyeball in place of rotating a camera itself to which the photographing optical system is attached, and which unit can make the camera compact as a whole, and can reduce noise.

It is another object of the present invention to provide a compact, lightweight, low-noise camera attached with the image recording unit which can realize the above object.

One aspect of the application is to provide an image pickup device or a camera which has a unit main body including an imaging lens and an image pickup means or a film in a support member having a spherical portion on its outer surface, and a driving unit for independently rotating the unit main body about at least two orthogonal axes.

In order to solve the above-mentioned problems and to achieve the above objects, an image recording unit according to another aspect of the present invention is characterized by the following arrangement.

More specifically, there is provided an image recording unit comprising: an image recording unit main body which accommodates at least an imaging lens and one of image pickup means and a film in a case, and has a spherical surface portion for defining a driving surface at least on an outer surface of the case; support means for rotatably supporting the image recording unit main body to have a crossing point of at least two orthogonal axes as a center of rotation of the spherical portion; and frictional driving means for frictionally driving the image recording unit main body independently in arbitrary directions by a frictional force generated between the driving surface and the support means.

With the above arrangement, the image recording unit main body can be pivoted like the behavior of an eyeball, and a photographing operation can be performed by pivoting only the image recording unit main body in an arbitrary direction. Since the driving operation of the image recording unit main body depends on frictional driving between the support means and the image recording unit, quiet and smooth pivotal motion can be attained. Furthermore, as compared to a conventional mechanism which pivots the entire camera using a panhead, since only the image recording unit main body is driven, a driving load is small, and power consumption can be saved. In addition, since the conventional mechanism using the panhead drives the entire heavy camera using a reduction mechanism, the output must be increased to increase the pivot speed, and it is difficult to stop the camera at a desired position due to a large moment of inertia. In contrast to this, since an object to be driven is the lightweight image recording unit main body, the pivot speed can be increased, and positioning precision can be improved. Furthermore, the image recording unit main body can be driven to have a crossing point of three orthogonal axes as a center.

An image recording unit according to still another aspect of the present invention is characterized by the following arrangement.

That is, there is provided an image recording unit comprising: an image recording unit main body which accommodates at least a photographing lens and photographing means in a case; two-axial direction support means, having a crossing point between orthogonal first and second axes as a center of rotation of the image recording unit main body, for independently pivotally supporting the image recording unit main body to have the first and second axes as centers; and driving means for driving the image recording unit main body independently in the two axial directions.

With this arrangement, the same effect as in the above-mentioned arrangement can be obtained. In addition, since the image recording unit main body is supported by the two-axial direction support means, the image recording unit main body can be reliably moved in each axial direction.

A camera according to the present invention is characterized by the following arrangement.

That is, an image recording unit described in any one of appended claims 1 to 13 is attached to a camera main body.

With this arrangement, a photographing operation can be performed by turning the image recording unit in an arbitrary direction without pivoting the camera itself.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 3A to 3E are views showing modifications of a spherical rotary unit fixing frame;

FIGS. 4A to 4D are views showing modifications of a spherical rotary unit;

FIG. 7 is a block diagram showing a stereoscopic image input apparatus according to the fourth embodiment of the present invention;

FIGS. 11A to 11D show the eighth embodiment of the present invention, in which FIG. 11A is a top view, FIG. 11B is a front view, FIG. 11C is a right-side view, and FIG. 11D is a rear view;

FIGS. 12A to 12D show the ninth embodiment of the present invention, in which FIG. 12A is a top view, FIG. 12B is a front view, FIG. 12C is a right-side view, and FIG. 12D is a rear view;

FIGS. 13A and 13B are top views showing the 10th embodiment of the present invention, in which FIG. 13A shows a modification of the ninth embodiment, and FIG. 13B shows a modification of the eighth embodiment.

DETAILED DESCRIPTION OF THE PREFERRED EMBODIMENTS

The preferred embodiments of the present invention will be described in detail hereinafter with reference to the accompanying drawings.

(First Embodiment)

Figure 1:
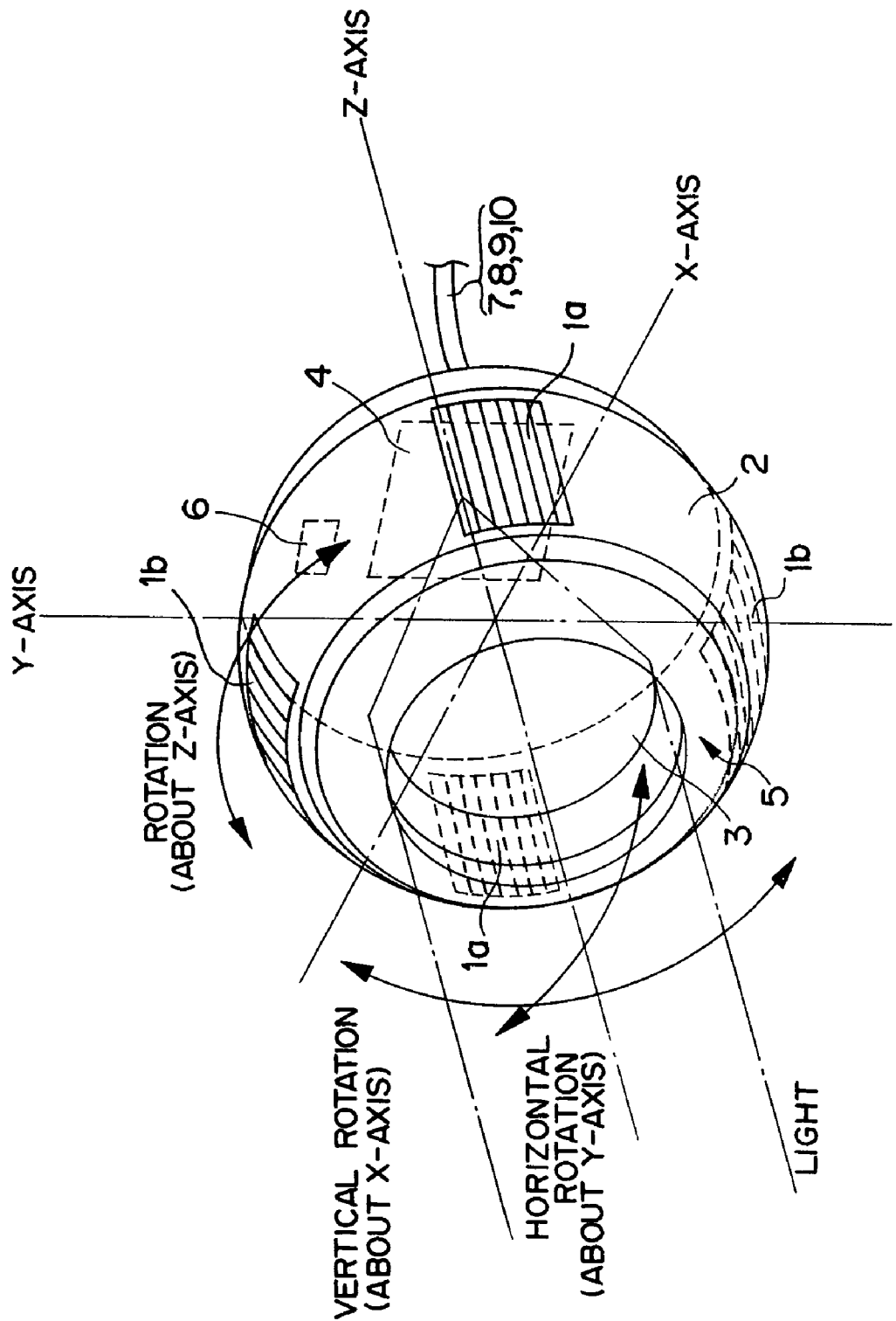
FIG. 1 is a perspective view showing the first embodiment of an image recording unit according to the present invention.

FIG. 1 is a perspective view showing an image recording unit according to the first embodiment.

Referring to FIG. 1, reference numeral 1 (1a and 1b) denotes piezoelectric elements for forming a traveling wave around the X-axis and a traveling wave around the Y-axis in a spherical rotary unit fixing frame 2 (to be described later) upon application of driving frequency voltages. When a driving frequency voltage is applied to the pair of piezoelectric elements 1a which are arranged to oppose each other in the horizontal direction, a traveling wave around the Y-axis is formed in the fixing frame 2. When a driving frequency voltage is applied to the pair of piezoelectric elements 1b which are arranged to oppose each other in the vertical direction, a traveling wave around the X-axis is formed in the fixing frame 2.

These traveling waves cause the surface particles on the fixing frame 2 as an elastic member to make an elliptic motion, and frictionally drive a spherical rotary unit 5 (to be described later) which is in press contact with the formation surfaces of the traveling waves. In this embodiment, the traveling waves are formed by the two pairs of opposing piezoelectric elements 1a and 1b. Alternatively, the traveling wave may be formed by each piezoelectric element. More specifically, when a traveling wave is formed in a predetermined direction in a vibration elastic member attached to one piezoelectric element, frictional driving forces are generated at a total of four positions. Note that the principle of formation of the traveling wave is known to those who are skilled in the art, and a detailed description thereof will be omitted. When two standing waves having a 90° phase difference therebetween are formed by a piezoelectric element on a vibration elastic member, the surface particles on the vibration elastic member make an elliptic motion upon synthesis of the two standing waves. With this elliptic motion, a member which is in press contact with the vibration elastic member is frictionally driven. If frequency voltages which are in phase with each other are applied to the piezoelectric elements which form two standing waves, no elliptic motion is formed, only standing waves are formed, and the vibration elastic member and the other member are in press contact with each other at the peaks of the waves in a point contact manner.

Reference numeral 2 denotes a spherical rotary unit fixing frame which fixes the piezoelectric vibration elements 1a and 1b, and also fixes the entire unit in the camera. The fixing frame 2 consists of, e.g., an elastic member such as a metal. In this embodiment, the piezoelectric elements 1 are provided to the spherical rotary unit fixing frame 2 to form traveling waves. Alternatively, piezoelectric elements for forming traveling waves may be provided to the spherical rotary unit 5 (to be described later).

Reference numeral 3 denotes an optical lens which is used for attaining condensing, focusing, and zooming operations; 4, an image pickup element (CCD) for converting an image obtained via the optical lens 3 into an electrical signal; and 5, a spherical rotary unit which accommodates the optical lens 3 and the image pickup element 4 in a case. The spherical rotary unit 5 is rotatable about the X- and Y-axes by the traveling waves which are excited by the piezoelectric elements 1 and cause an elliptic motion in the rotary unit fixing frame 2, which is in press contact with the rotary unit 5. When in-phase frequency voltages are applied to the piezoelectric elements serving as a support axis of rotation (e.g., the piezoelectric elements arranged in the vertical direction when the unit is rotated about the Y-axis), since these piezoelectric elements do not form traveling waves, a point contact bearing is constituted at that portion, and the spherical rotary unit can be smoothly rotated.

Reference numeral 6 denotes a direction sensor for detecting the rotational angle of the spherical rotary unit 5 with respect to the camera main body; and 7, 8, 9, and 10, an image signal line for sending image information from the image pickup element 4, a direction control signal line for sending information for driving the piezoelectric elements 1, a lens control signal line for controlling the optical lens 3, and a direction sensor signal line for sending information from the direction sensor 6, respectively.

Figure 2:
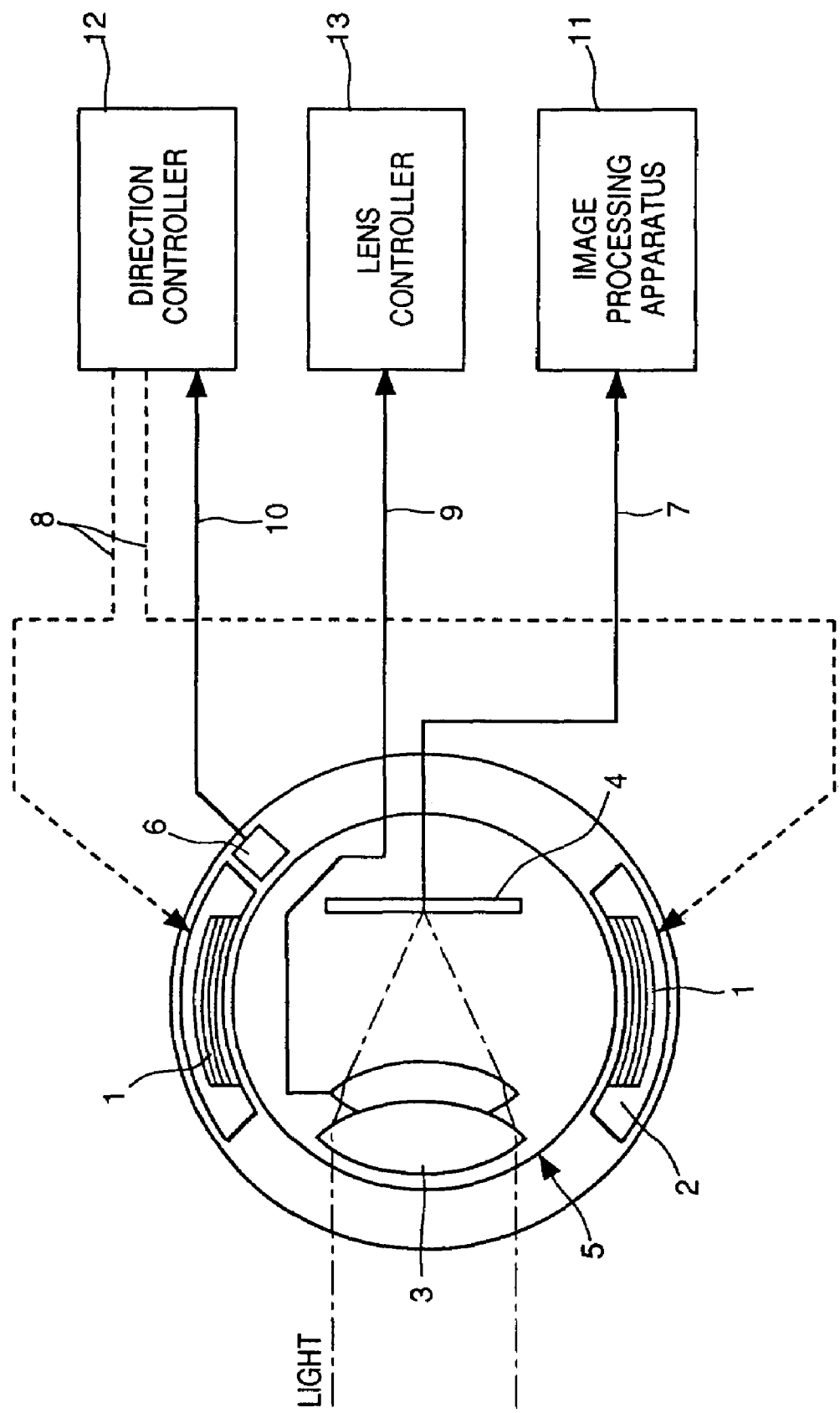
FIG. 2 is a side sectional view of FIG. 1.

FIG. 2 is a side sectional view which is provided for the purpose of easy understanding of the structure of this embodiment. Referring to FIG. 2, reference numeral 11 denotes an image processing apparatus for reconstructing electric information from the image pickup element 4 as an image; 12, a direction controller for changing the direction of the spherical rotary unit 5 by driving the piezoelectric elements 1; and 13, a lens controller for controlling the focusing and zooming operations of the optical lens 3. The movement of the spherical rotary unit 5 is controlled while the rotational position of the spherical rotary unit 5 is confirmed by the direction sensor 6 and is constantly fed back to the direction controller 12.

The operation of this embodiment will be described below.

When the spherical rotary unit 5 faces the front side of the camera, since the fixing frame 2 to which the piezoelectric elements 1 are attached is in press contact with the spherical rotary unit 5, the spherical rotary unit 5 is fixed, i.e., in a lock state due to friction of the contact surfaces if no voltages are applied to the piezoelectric elements 1. More specifically, even when the camera main body vibrates, the relative direction of the spherical rotary unit 5 with respect to an object to be photographed is maintained.

When the frame is to be panned in the horizontal direction (the spherical rotary unit 5 is rotated in the horizontal direction), driving frequency voltages are applied to the pair of right and left piezoelectric elements 1a. Then, an elliptic motion having an axis of rotation in the Y-axis direction is formed in the fixing frame 2 in the X-Y plane. With this elliptic motion, the spherical rotary unit 5 is rotated about the Y-axis in FIG. 1, and can photograph an object to be photographed in the right-and-left direction via the optical lens 3 and the image pickup element 4. When the frequency voltages applied to the piezoelectric elements 1 are stopped, the spherical rotary unit 5 is locked at a desired angle by the frictional force of the press contact surfaces. As a result, the direction of the spherical rotary unit 5 can be fixed, and the photographing direction can be fixed.

Similarly, when the frame is to be panned in the vertical direction (the spherical rotary unit 5 is rotated in the vertical direction), driving frequency voltages are applied to the pair of upper and lower piezoelectric elements 1b. Then, an elliptic motion having an axis of rotation in the X-axis direction is formed in the fixing frame 2 in the Y-Z plane. With this elliptic motion, the spherical rotary unit 5 is rotated about the X-axis in FIG. 1, and can photograph an object to be photographed in the vertical direction via the optical lens 3 and the image pickup element 4. When the frequency voltages applied to the piezoelectric elements 1 are stopped, the spherical rotary unit 5 is locked at a desired angle by the frictional force of the press contact surfaces. As a result, the direction of the spherical rotary unit 5 can be fixed, and the photographing direction can be fixed.

When the photographing direction is fixed and the frame is moved in a tilted direction (the spherical rotary unit 5 is rotated in a plane perpendicular to the Z-axis), voltages are applied to one or two pairs of the piezoelectric elements 1 in the vertical and horizontal directions to form elliptic motions having the Z-axis in FIG. 1 as a center in the same rotational direction on the driving surfaces of the piezoelectric elements 1.

Thus, the spherical rotary unit 5 is rotated about the Z-axis in FIG. 1, and a tilted image can be photographed via the lens 3 and the image pickup element 4. When the frequency voltages applied to the piezoelectric elements 1 are stopped, the spherical rotary unit 5 is locked at a desired angle by the frictional force of the press contact surfaces, and a photographed image can be fixed.

Furthermore, by combining the above-mentioned rotations, the frame can be oscillated in an arbitrary direction (the spherical rotary unit 5 can be rotated about an arbitrary axis). Note that the rotational moving amount of the spherical rotary unit 5 with respect to the camera main body can be confirmed by the direction sensor 6.

In addition to the horizontal and vertical directions, the rotary unit 5 can be rotated in the tilted direction. Furthermore, by combining the horizontal and vertical rotations, the rotary unit 5 can be smoothly rotated in an arbitrary direction. By utilizing these features, the frame can be easily set by a remote control operation in a self-timer photographing mode of the camera without using a tripod or panhead. In addition, this image recording unit can be applied to a remote control operation of a monitor camera for crime prevention.

Note that the rotary unit 5 need not have a perfect spherical shape, but only its rotation range need have a spherical shape. For example, in addition to the spherical shape shown in FIG. 3A, spherical shape+conical shape in FIG. 3B, spherical shape+planar shape in FIG. 3C, spherical shape+cylindrical shape in FIG. 3D, a type having a lens and an image pickup element outside a spherical unit in FIG. 3E, and the like are available.

As the type of the spherical rotary unit fixing frame and the number and arrangement of piezoelectric elements, those shown in FIGS. 4A to 4D may be used. As shown in FIG. 4A, a transparent spherical rotary unit fixing frame is adopted to widen the view field range photographed by the camera. As for the number and arrangement of piezoelectric elements, the piezoelectric elements may be arranged around the spherical rotary unit in a ring pattern, or a large number of piezoelectric elements may be arranged, as shown in FIG. 4B. Also, as shown in FIG. 4C, the piezoelectric elements may be arranged to form symmetrical pairs, or to be paired with rotors or low-frictional members. Furthermore, as shown in FIG. 4D, a driving operation may be realized by only one piezoelectric element, and the shape of the piezoelectric element such as a circular shape, ring shape, rectangular shape, polygonal shape, or the like may be selectively used depending on the rotational direction and the arrangement position.

In place of the driving piezoelectric elements, a columnar ultrasonic wave motor or a normal electromagnetic motor may be used.

In the following description up to the fifth embodiment, assume that the unit has a spherical shape, and two pairs of piezoelectric elements are fixed by a stripe-shaped frame to be shifted from each other by 90°.

(Second Embodiment)

Figure 5:
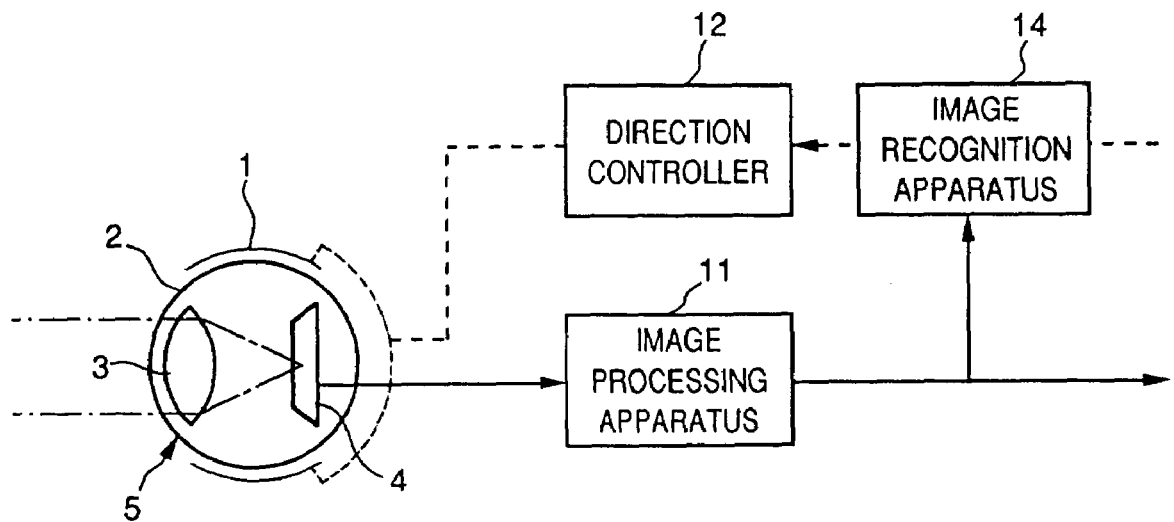
FIG. 5 is a block diagram showing an image recognition apparatus according to the second embodiment of the present invention.

FIG. 5 shows the second embodiment.

In this embodiment, the first embodiment is applied to image processing. An electrical signal obtained by converting an image by the image pickup element 4 in the spherical rotary unit 5 is reconstructed as an image by the image processing apparatus 11, and the contents of the image are recognized by an image recognition apparatus 14. Depending on recognition methods, items such as shape, color, operation, change, and the like can be recognized. By feeding back information of the image recognition apparatus 14 to the direction controller 12, a required object to be photographed can be automatically selected and traced. In addition, the ON/OFF state of an image recording operation can be automatically switched.

For example, when a person is selected and traced by a monitor camera for crime prevention, the image recognition apparatus 14 recognizes a moving object to catch the person as an object, so as to perform a zoom-up photographing operation of his or her face or to trace his or her action.

(Third Embodiment)

Figure 6:
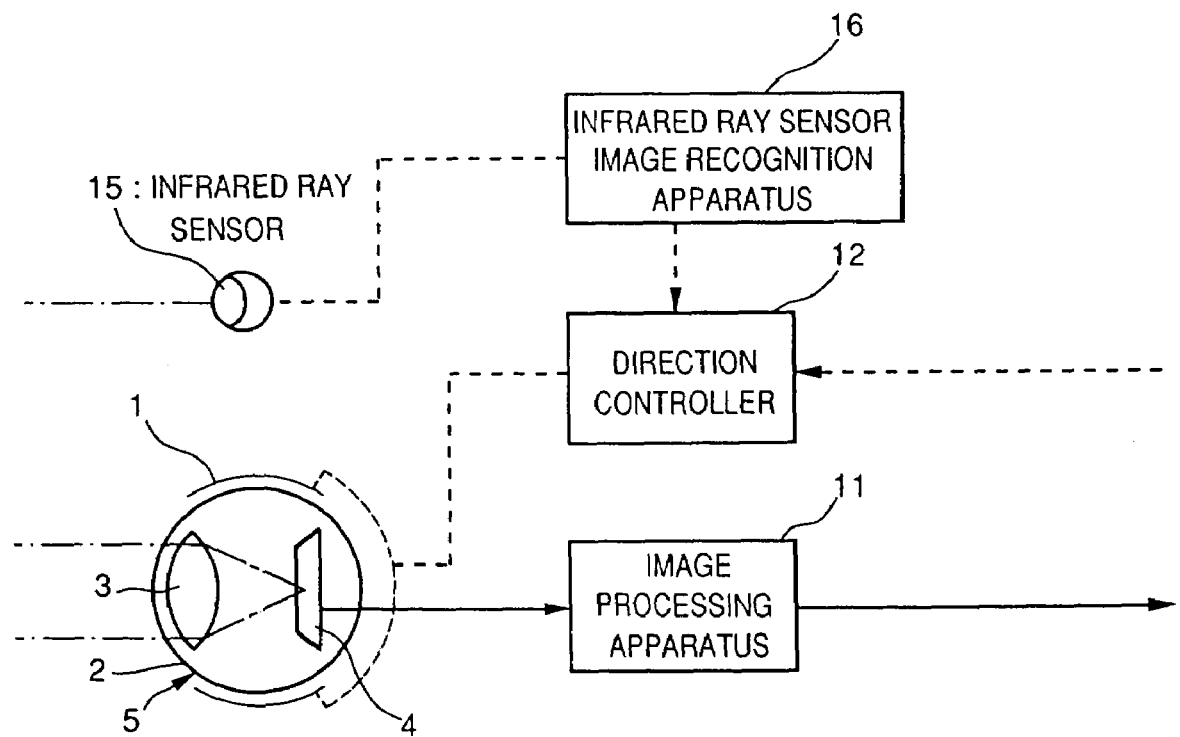
FIG. 6 is a block diagram showing an infrared ray image recognition apparatus according to the third embodiment of the present invention.

FIG. 6 shows the third embodiment.

In this embodiment, the first embodiment is combined with various sensors. As the sensors, various sensors such as an infrared ray sensor, a temperature sensor, an ultrasonic wave sensor, and the like are available. In this embodiment, an example using an infrared ray sensor will be explained.

FIG. 6 is a schematic diagram showing the arrangement in which an infrared ray sensor and an image processing apparatus are arranged in the first embodiment. Information from an infrared ray sensor 15 is recognized by an infrared ray sensor image recognition apparatus 16. Based on information from the infrared ray sensor 15, items such as shape, color, operation, change, and the like can be recognized. By feeding back information of the infrared ray sensor image recognition apparatus 16 to the direction controller 12, a required object to be photographed can be automatically selected and traced. Also, the ON/OFF operation of the camera can be automatically switched.

For example, when a person in a dark place is selected and traced by a monitor camera for crime prevention, the infrared ray sensor image recognition apparatus 16 recognizes a moving object, and a lamp in the room is turned on to catch the person as an image, thus allowing a zoom-up photographing operation of his or her face or tracing his or her action.

When another sensor such as an ultrasonic wave sensor, a temperature sensor, or the like is used, the person can be recognized in the same manner as described above.

(Fourth Embodiment)

FIG. 7 shows the fourth embodiment.

In this embodiment, the first embodiment is applied to a stereoscopic image input apparatus for a robot or a virtual reality (VR) system. As shown in FIG. 7, two spherical rotary optical units 5 are assembled in a robot or a VR system as the right and left eyes. Information signals photographed by the two spherical rotary optical units 5 are reconstructed as an image by the image processing apparatus 11. At the same time, the image is supplied to the image recognition apparatus 14 to analyze the shape, color, and movement of an object to be photographed. The image recognition apparatus 14 supplies a feedback signal to the direction controller 12, so that the right and left spherical rotary optical units 5 photograph an identical object at the centers of the corresponding image pickup elements 4. With this processing, a stereoscopic image which a photographer would see in practice at that place can be realized in a virtual space via, e.g., a headmount display. When the focusing and zooming operations of the camera are performed in correspondence with the visual axis of a photographer, the reality of the image can be enhanced.

If this two-eye system is used, the size and distance of an object to be photographed can be calculated on the basis of the focusing positions of the optical lenses and the rotational angles of the spherical rotary units. Furthermore, when the spherical rotary units are controlled, the visual axis (the movement of the eyeball of a man) of a photographer or observer may be detected by a visual axis detection apparatus 19, and the spherical rotary units can be rotated in the moving direction of the visual axis. With this arrangement, a natural camera movement, which reflects an operator's will can be realized without imposing an extra load on an operator.

(Fifth Embodiment)

Figure 8A:
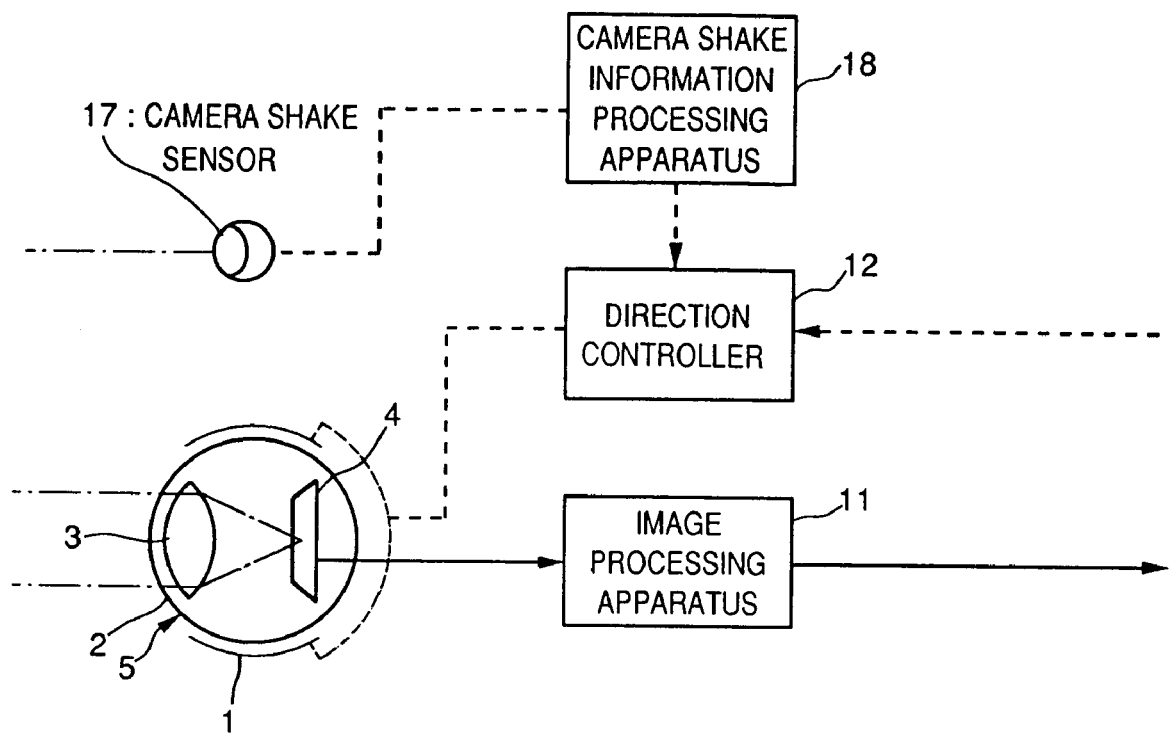
FIGS. 8A and 8B are respectively a block diagram and a schematic view showing a camera shake correction apparatus according to the fifth embodiment of the present invention.
Figure 8B:
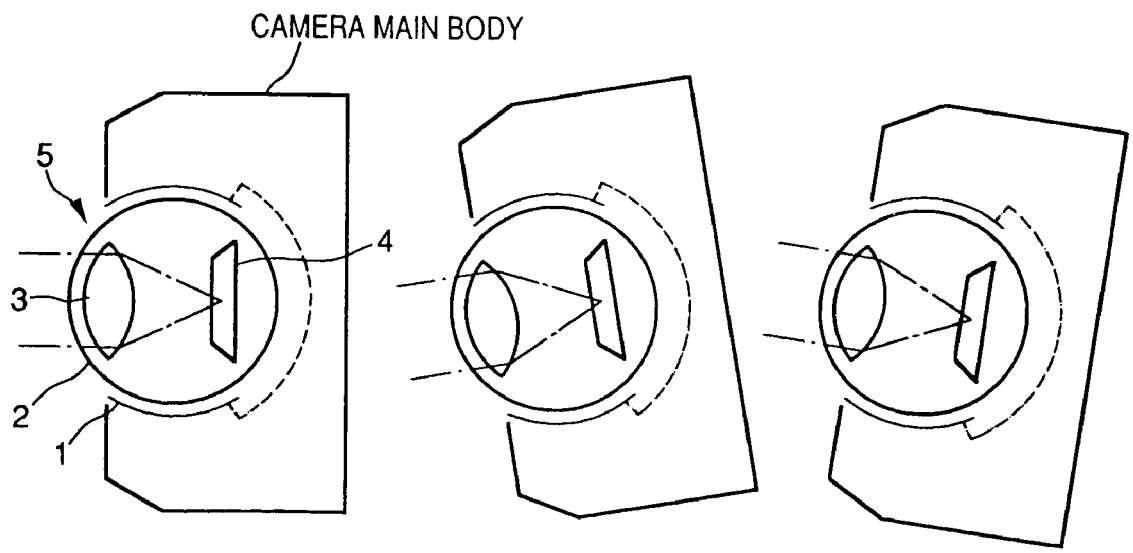

FIGS. 8A and 8B show the fifth embodiment.

In this embodiment, the first embodiment is applied to a camera shake prevention system or an anti-vibration system of visual information of a moving robot.

When a camera is held by hands or when a robot to which a camera is attached is working or moving, an image photographed by the camera blurs due to a vibration of the main body. The vibration of the camera or the robot main body is detected by a camera shake sensor 17 shown in FIG. 8A, and a camera shake information processing apparatus 18 analyzes the direction, amplitude, period, and the like of the vibration on the basis of the detected information, thereby calculating information for canceling the vibration. The calculated information is fed back to the direction controller 12 to rotate the spherical rotary optical unit, thereby suppressing an image blur. With this processing, as shown in FIG. 8B, even when the camera main body vibrates in the vertical and horizontal directions, the direction of the spherical rotary optical unit relative to an object to be photographed can be maintained. In a conventional camera shake prevention mechanism, image quality deteriorates due to area movement of electric information, tilt of a variangle prism, and the like. However, by utilizing this embodiment, high image quality can be assured.

(Sixth Embodiment)

Figure 9:
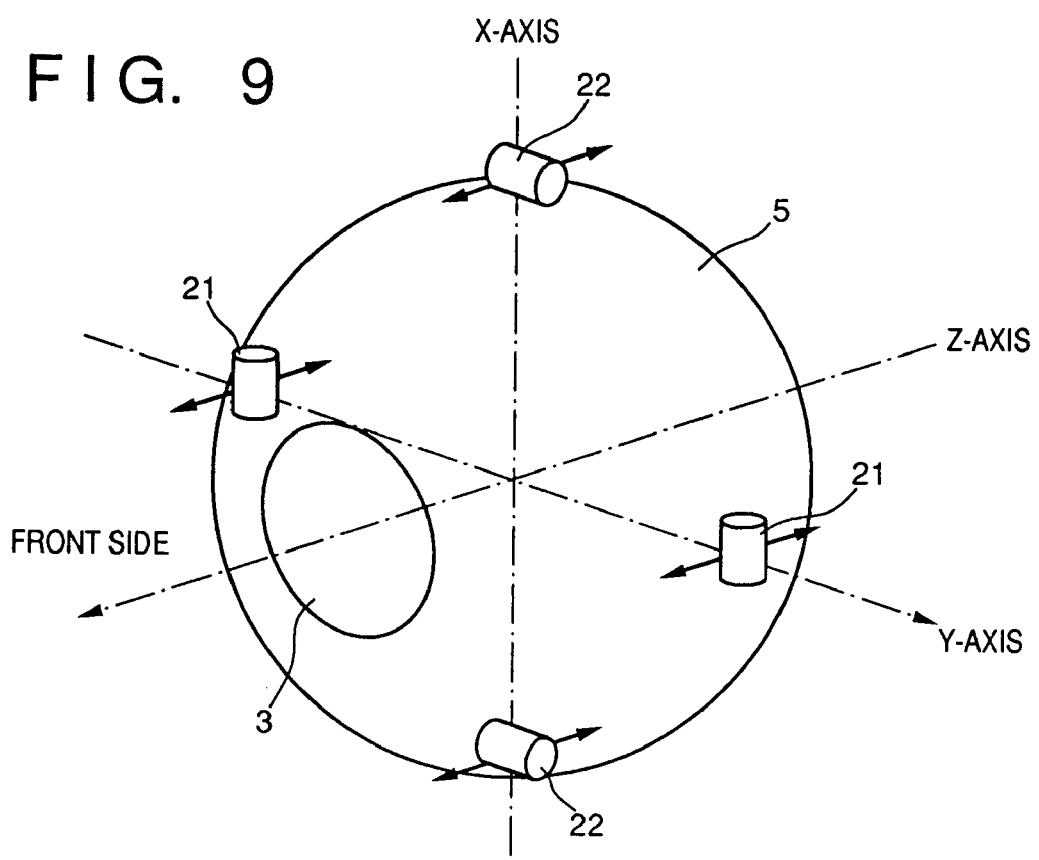
FIG. 9 is a schematic perspective view showing the sixth embodiment of the present invention.

FIG. 9 shows the sixth embodiment.

In the first embodiment described above, the spherical rotary unit 5 is frictionally driven by traveling waves generated by the piezoelectric elements. However, in this embodiment, as shown in FIG. 9, a pair of rollers 21 for rotation about the X-axis, and a pair of rollers 22 for rotation about the Y-axis are arranged on the inner surface side of the fixing frame 2. These rollers 21 and 22 contact the rotary unit 5. By rotating the rollers 21, the spherical rotary unit 5 can be pivoted about the X-axis passing the center of a sphere. With this arrangement, for example, the spherical rotary unit 5 can be moved in the horizontal direction from a state wherein the visual axis of the camera faces forward. On the other hand, by rotating the rollers 22, the spherical rotary unit 5 can be pivoted about the Y-axis passing the center of the sphere. With this arrangement, for example, the spherical rotary unit 5 can be moved in the vertical direction from a state wherein the visual axis of the camera faces forward. As driving sources of these rollers 21 and 22, electromagnetic motors, rod-shaped ultrasonic wave motors, and the like may be used. However, the present invention is not limited to these. More specifically, the rotational shafts (rotors) of motors may be coupled to the rotational shafts of the rollers 21 and 22. By rotating the pair of rollers 21 in the same rotational direction, the rotary unit may be moved in the horizontal direction. By rotating the pair of rollers 22 in the same direction, the rotary unit may be moved in the vertical direction. Note that the rotation control of the motors is achieved by the direction controller shown in FIG. 2 by issuing a rotational direction command thereto.

(Seventh Embodiment)

Figure 10:
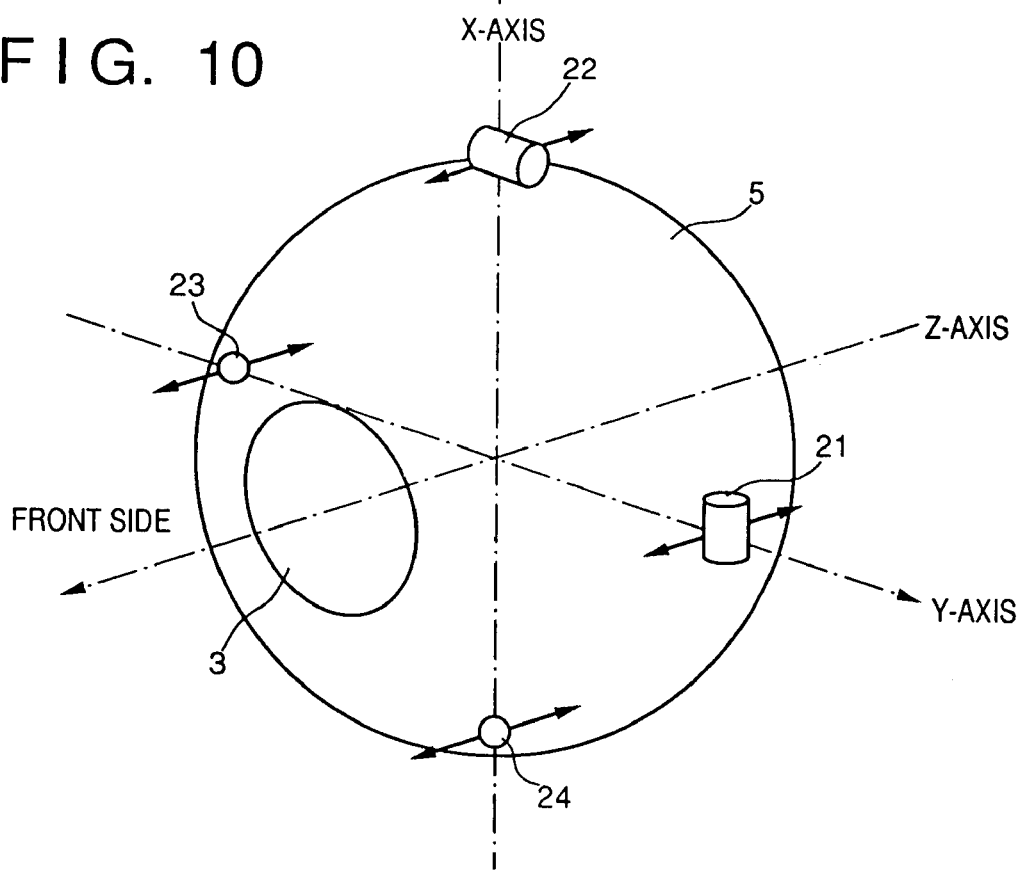
FIG. 10 is a schematic perspective view showing the seventh embodiment of the present invention.
Figure 11A:
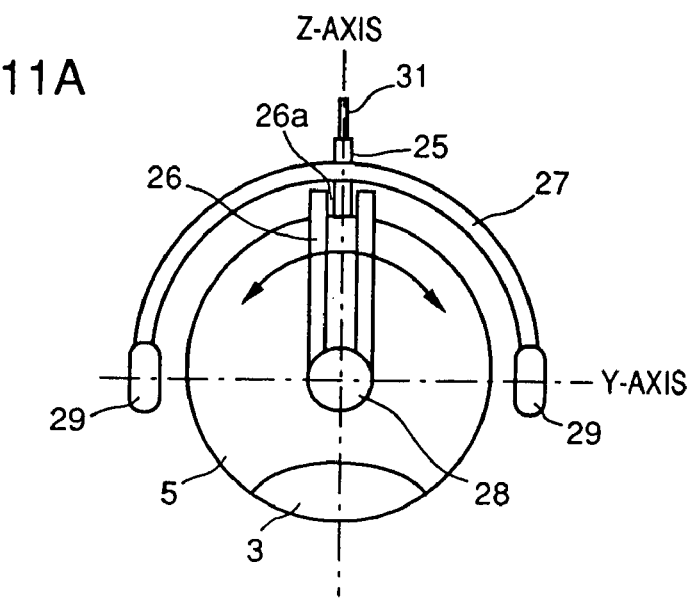
Figure 11B:
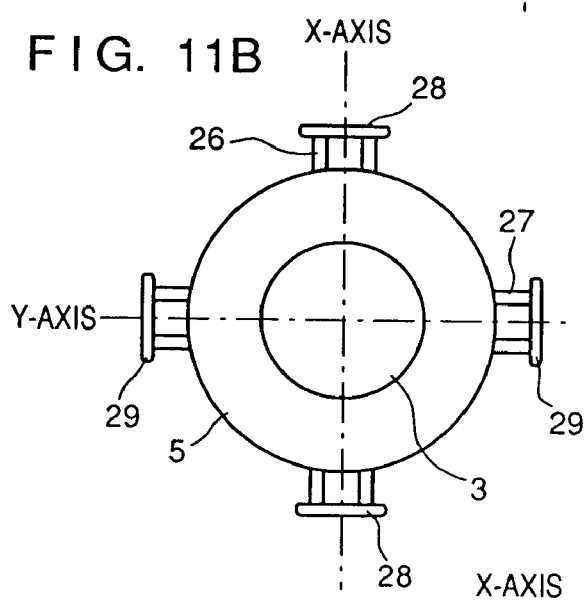
Figure 11C:
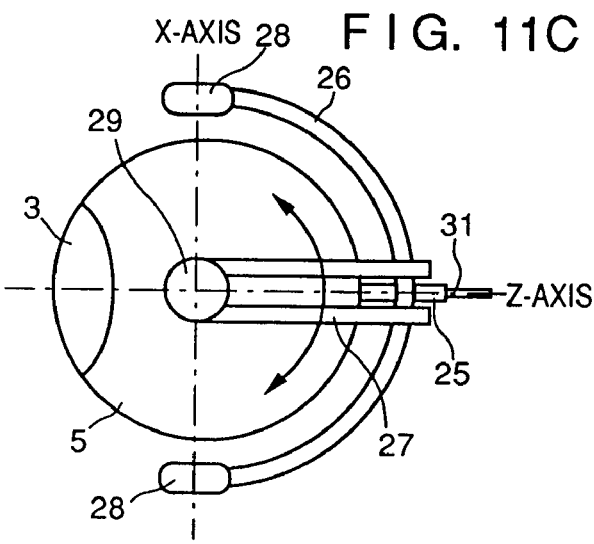
Figure 11D:
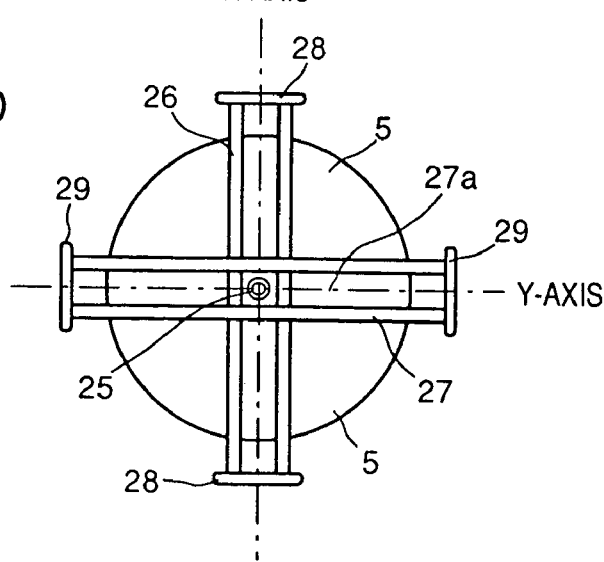
Figure 12A:
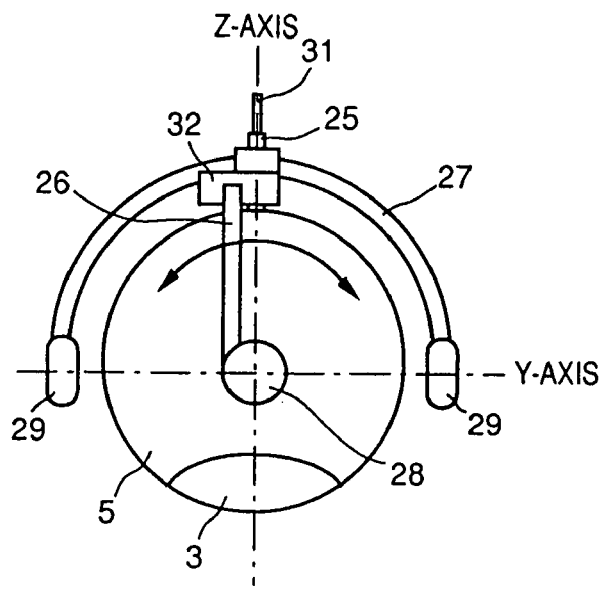
Figure 12B:
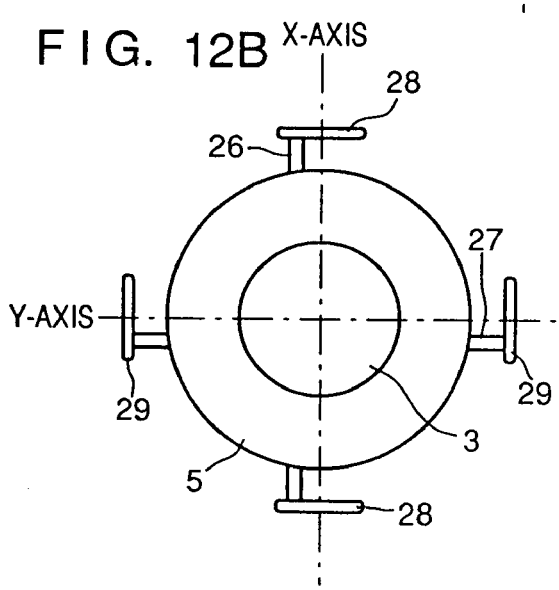
Figure 12C:
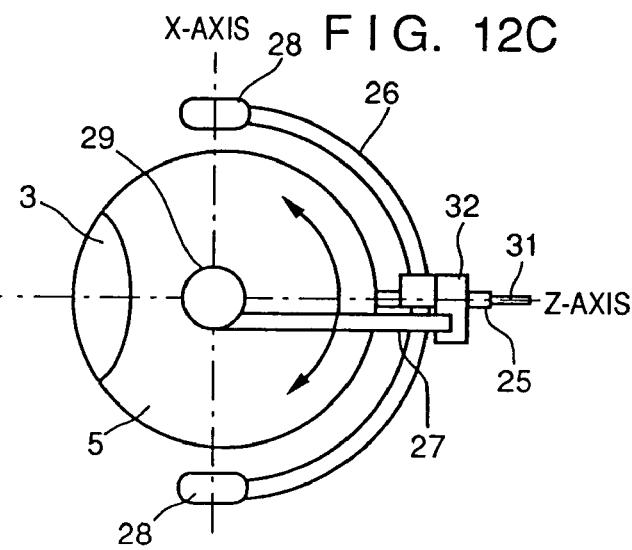
Figure 12D:
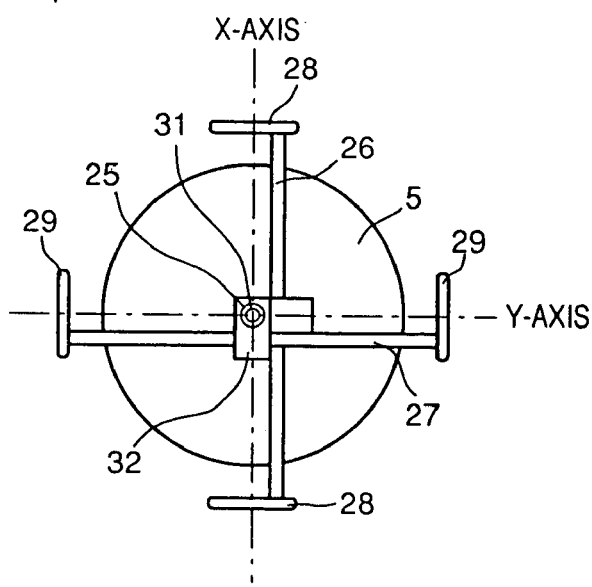

FIG. 10 shows the seventh embodiment.

In the sixth embodiment described above, the two pairs of opposing rollers 21 and 22 for driving are arranged. However, in this embodiment, point contact type rotors 23 and 24 such as ball bearings are arranged to face single rollers 21 and 22, respectively.

In this embodiment, since the rotations, in an arbitrary direction, of the rotors 23 and 24 are not restricted at all, they can be rotated in combination with the rollers 21 and 22. With this arrangement, the spherical rotary unit 5 can be rotated about an arbitrary axis of rotation. In this embodiment as well, the driving motors are provided to the rollers 21 and 22 as in the sixth embodiment.

(Eighth Embodiment)

FIGS. 11A to 11D show the eighth embodiment.

Reference numeral 26 denotes a first support bar having a semi-arcuated shape; and 27, a second support bar having a semi-arcuated shape. These first and second support bars 26 and 27 are concentrically arranged outside the spherical rotary unit 5, and respectively have the X- and Y-axes passing the center of rotation of the spherical rotary unit 5 as axes of rotation. Central slits 26a and 27a are respectively formed at the centers of the first and second support bars 26 and 27 to extend in their longitudinal direction. These central slits 26a and 26a engage with an engaging member 25 extending outwardly from the rotary unit 5, and the engaging member 25 slides along these central slits 26a and 27a. In this embodiment, power cables, signal cables, and the like for the optical lens, image pickup element, and the like extend through the interior of the engaging member 5.

Reference numeral 28 denotes a first support shaft portion serving as a rotational support shaft of the first support bar 26; and 29, a second support portion serving as a rotational support shaft of the second support bar 27. These first and second support shaft portions 28 and 29 are rotatably attached to the inner surface side of the fixing frame 2 shown in FIG. 1, the camera main body, or a fixing base (not shown). Driving motors (not shown) such as electromagnetic motors, ultrasonic wave motors, or the like are attached to these first and second support shaft portions 28 and 29.

Therefore, when the motor for the first support shaft portion 28 is driven, the first support bar 26 is pivoted about the X-axis, and the engaging member 25 which engages with the central slit 26a of the first support bar 26 slides along the central slit 27a of the second support bar 27, thereby pivoting the spherical rotary unit 5 about the X-axis.

On the other hand, when the motor for the second support shaft portion 29 is driven, the second support bar 27 is pivoted about the Y-axis, and the engaging member 25, which engages with the central slit 27a of the second support bar 27, slides along the central slit 26a of the first support bar 26, thereby pivoting the spherical rotary unit 5 about the Y-axis. Furthermore, when these driving motors are rotated at the same time, the spherical rotary unit 5 can be quickly rotated in an arbitrary direction.

(Ninth Embodiment)

FIGS. 12A to 12D show the ninth embodiment.

In the eighth embodiment described above, the engaging member 25 engages with the central slits 26a and 27a formed at the centers of the first and second support bars 26 and 27. However, in this embodiment, no central slits are formed on the first and second support bars 26 and 27. A slidable coupling member 32 is attached to both the first and second support bars 26 and 27, and engages with the engaging member 25.

Therefore, as in the eighth embodiment, when the driving sources for the first and second support shaft portions are operated, the coupling member 32 can be moved along the first and second support bars 26 and 27, thereby rotating the spherical rotary unit 5 via the engaging member 25.

(10th Embodiment)

Figure 13A:
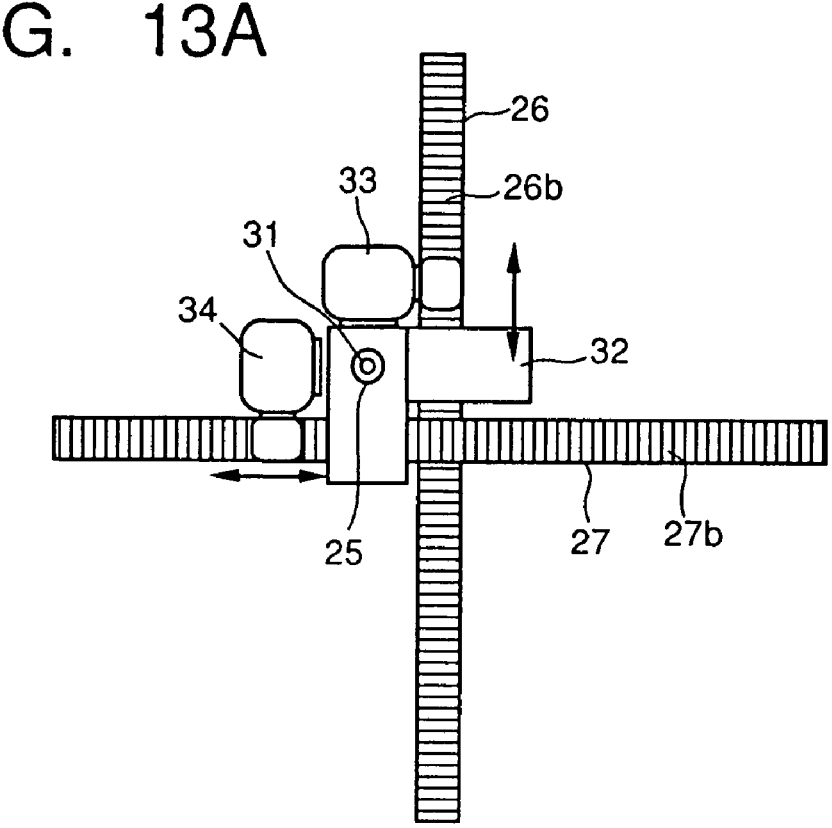
Figure 13B:
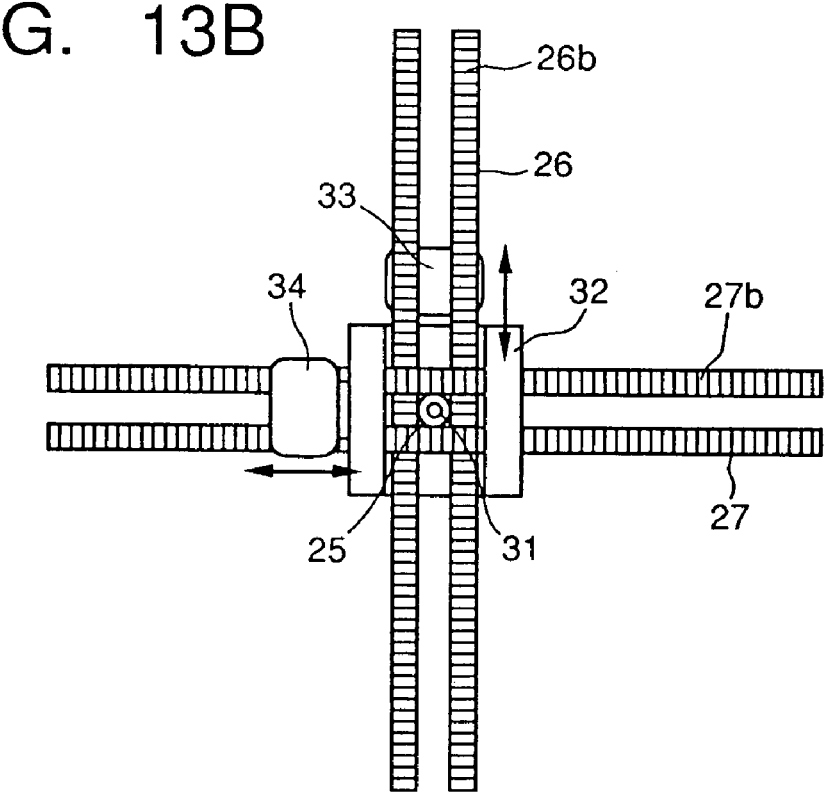

FIGS. 13A and 13B show the 10th embodiment.

In the eighth and ninth embodiments described above, the first and second support shaft portions 28 and 29 serving as rotational support shaft portions of the first and second support bars 26 and 27 are driven by the motors to pivot the spherical rotary unit 5. However, in a modification of the ninth embodiment shown in FIG. 13A, gear portions 26b and 27b are respectively formed on the surfaces of the first and second support bars 26 and 27. A first motor 33 having a motor gear which meshes with the gear portion 26b, and a second motor 34 having a motor gear which meshes with the gear portion 27b are respectively attached to the coupling member 32, and the spherical rotary unit 5 is pivoted via the engaging member 25, which engages with the coupling member 32.

In a modification of the eighth embodiment shown in FIG. 13B, the coupling member 32 is slidably coupled to the first and second bars 26 and 27, and also serves as a mount base of the driving motors 33 and 34. The engaging member 25 engages with the central slits.

In this embodiment, the first and second support bars 26 and 27 are driven in the vicinity of the engaging member 25 in place of driving their rotational support shafts unlike in the eighth and ninth embodiments. Therefore, a sufficient driving operation can be assured even by a small torque, and high-speed, high-precision positioning can be realized.

(11th Embodiment)

Figure 14A:
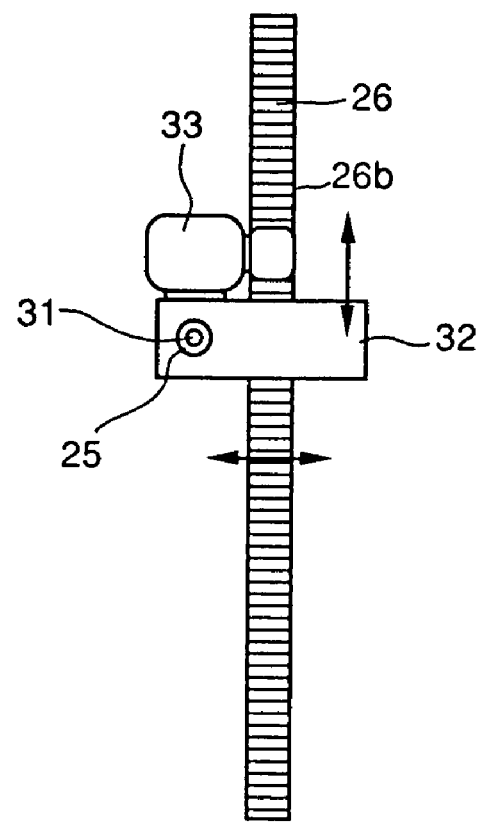
FIGS. 14A and 14B are top views showing the 11th embodiment of the present invention.
Figure 14B:
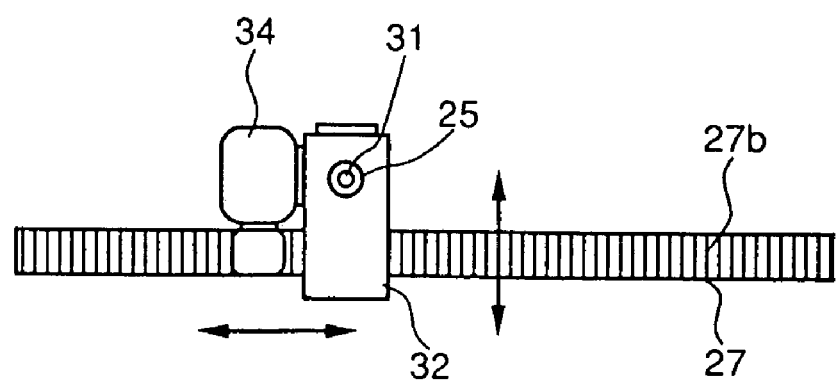

FIGS. 14A and 14B show the 11th embodiment.

In this embodiment, the embodiments shown in FIGS. 12A to 13B are combined. In FIG. 14A, the pivot support shaft of the first support bar 26 is pivoted about the X-axis by a driving motor to pivot the spherical rotary unit 5 about the X-axis. By driving the driving motor 33 of the coupling member 32 slidably attached to the first support bar 26, the spherical rotary unit 5 can be pivoted about the Y-axis via meshing between the gear portion 26b of the first support bar 26 and the motor gear.

In FIG. 14B, the pivot support shaft of the second support bar 27 is pivoted about the Y-axis by a driving motor (not shown) to pivot the spherical rotary unit 5 about the Y-axis. By driving the driving motor 34, the spherical rotary unit 5 is pivoted about the X-axis via meshing between the gear portion 27b of the second support bar 27 and the motor gear.

In this embodiment, the spherical rotary unit can be pivoted in an arbitrary direction by only one support bar.

Note that in place of attaching the driving source to the coupling member 32, the coupling member 32 may be driven by an endless pivot wire (belt) or the like.

(12th Embodiment)

In the embodiments shown in FIGS. 11A to 12D, since the first and second support bars 26 and 27 have crossing portions therebetween, they can be driven using the principle of an electromagnetic linear motor.

For example, in the arrangement shown in FIGS. 11A to 11D, when electromagnets for generating S and N poles are assembled in the first and second support bars 26 and 27, the support bar on the energization control side can be moved in a desired direction with respect to the other support bar whose S and N poles do not change.

In the arrangement shown in FIGS. 12A to 12D, magnets for generating S and N poles are assembled in the first and second support bars 26 and 27, electromagnets for generating S and N poles are assembled in the coupling member 32 in correspondence with the first and second support bars 26 and 27, and the coupling member can be moved by controlling the electromagnets assembled in the coupling member.

(13th Embodiment)

In the eighth to 12th embodiments described above, in order to align the spherical rotary unit 5 in an arbitrary direction, the position of the spherical rotary unit must be detected by some method, and must be feedback-controlled. This method will be explained below.

(First Control Method)

Independently of whether driving sources are arranged in the support shaft portions of the first and second support bars or a driving source is arranged in the coupling member, the positions of the support bars and the coupling member are detected as angle information, and the obtained two pieces of angle information are feedback-controlled together with the angle coordinate position having, as a center, a home position where the spherical rotary unit 5 faces forward.

(Second Control Method)

The positions of the crossing points of the two support bars are detected as distance information from the home position, and two distance values are feedback-controlled together with the distance coordinate position having the home position as the center.

(Third Control Method)

The rotational angles or moving distances of the first and second driving sources or support bars are extracted as electrical signals, and two angle values are feedback-controlled together with the angle coordinate position having the home position as the center, thereby performing direction control.

(Fourth Control Method)

An angle sensor comprising a vibration gyro such as an angular velocity sensor, a piezoelectric sensor, or the like is arranged in the spherical rotary unit 5, and angle information from the angular velocity sensor is fed back to the driving sources together with the angle coordinate position having the home position as the center, thereby performing direction control.

(14th Embodiment)

In the eighth to 12th embodiments described above, the spherical rotary unit 5 is rotated about the X- and Y-axes. Alternatively, the first and second support bars may be supported and fixed on the main body via a ring-shaped gyro rotary mechanism which is perpendicular to the two arcs of these bars, thus rotating the spherical rotary unit 5 about the Z-axis as well.

In each of the above embodiments, an optical image from the imaging lens is received by the image pickup element. Alternatively, a film may be arranged in place of the image pickup element to constitute a still camera.

As described above, according to each of the above embodiments, the image recording unit main body can be pivoted like the behavior of an eyeball, and a photographing operation can be performed by pivoting only the image recording unit main body in an arbitrary direction. Since the driving operation of the image recording unit main body depends on frictional driving between the support means and the image recording unit, a quiet and smooth pivotal motion can be attained. Furthermore, as compared to a conventional mechanism which pivots the entire camera using a panhead, since only the image recording unit main body is driven, the driving load is small, and power consumption can be saved. In addition, since the conventional mechanism using the panhead drives the entire heavy camera using a reduction mechanism, the output must be increased to increase the pivot speed, and it is difficult to stop the camera at a desired position due to a large moment of inertia. In contrast to this, since an object to be driven is the lightweight image recording unit main body, the pivot speed can be increased, and positioning precision can be improved. Furthermore, the image recording unit main body can be driven to have a crossing point of three orthogonal axes as a center.

Since the image recording unit main body is supported by the two-axial direction support means, the image recording unit main body can be reliably moved in each axial direction.

Since the case itself to be rotated has a spherical shape as a whole, the image recording unit main body can be easily supported, and a free pivotal motion can be assured.

The image recording unit main body can be pivoted in an arbitrary direction by a simple arrangement, i.e., by arranging electro-mechanical energy conversion elements for forming traveling waves such as piezoelectric elements on the driving surface or support means side. This driving method is very quiet, and guarantees a very small pivotal motion and realizes high-precision positioning.

A compact, simple driving mechanism can be obtained.

Since the rotors comprise low-frictional members including bearings, and are driven in corresponding axial directions by the driving rollers opposing the rotors, the same amounts of rotation can be obtained by the two driving rollers and movements in the two axial directions can be smoothly achieved.

Since the image recording unit main body is pivoted using the first and second support members, a reliable pivotal motion can be assured.

Since the first and second support members can have shapes matching the spherical image recording unit main body, a compact structure can be efficiently realized, resulting in high efficiency in the entire structural space.

Since the driving means directly drives the coupling means, the image recording unit main body can be pivoted even by a small torque, and high-speed, high-precision driving control can be realized.

The image recording unit can be freely moved in two orthogonal axial directions by a single support member.

The photographing main body can be pivoted in a desired direction by feedback control, and high-speed, high-precision control can be realized with low power consumption.

In addition, a photographing operation can be performed by turning the image recording unit in an arbitrary direction without pivoting the camera itself.

The present invention is not limited to the above embodiments and various changes and modifications can be made within the spirit and scope of the present invention. Therefore, to apprise the public of the scope of the present invention the following claims are made.

What is claimed is:

1. An image recording unit comprising:
an image recording unit main body which accommodates at least an imaging lens and one of image pickup element or a film in a case, and has a spherical surface portion for defining a driving surface at least on an outer surface of the case; and
frictional driving source which comprises electro-mechanical energy conversion elements, said electro-mechanical energy conversion elements generating a traveling wave by being supplied wave signals whose phases are different to each other and being in press contact with said driving surface,
wherein said frictional driving source drives said image recording unit main body independently in arbitrary directions by said traveling wave; and
wherein one of said image pickup element or said film is arranged at a location within an inner space of the case that is within a spherical shape formed by the spherical surface portion of the outer surface of the case.

2. The image recording unit according to claim 1, wherein the case is formed in a spherical shape as a whole.

3. The image recording unit according to claim 1, wherein said electro-mechanical energy conversion elements for forming traveling waves are arranged in correspondence with a predetermined driving directions.

4. The image recording unit according to claim 3, further comprising control device which controls said electro-mechanical energy conversion elements so that standing waves are generated on the mechanical energy conversion elements arranged on the one direction and traveling waves are generated on the electro-mechanical energy conversion elements arranged on the other direction when said unit is rotated around said one direction.

5. The image recording unit according to claim 1, wherein said electro-mechanical energy conversion elements for forming traveling waves integrally achieve driving operations in the respective predetermined directions.

6. The image recording unit according to claim 1, further comprising detection device which detects a position of said image recording unit main body, and control device which drives said frictional driving source on the basis of information from said detection device to rotate said image recording unit main body in an arbitrary direction.

7. A camera wherein an image recording unit described in claim 1 is attached to a camera main body.

8. The image recording unit according to claim 1, further comprising support member which rotatably supports said image recording unit main body to have a crossing point of at least two orthogonal axes as a center of rotation of the spherical portion.

* * * * *